United States Patent [19]
Boardman et al.

[11] Patent Number: 6,161,840
[45] Date of Patent: Dec. 19, 2000

[54] ELASTOMERIC SEALING ASSEMBLY

[75] Inventors: Thomas A. Boardman, Gilford; Mark A. Lanham, Dunbarton, both of N.H.

[73] Assignee: Freudenberg-NOK General Partnership, Plymouth, Mich.

[21] Appl. No.: 09/131,973

[22] Filed: Aug. 11, 1998

Related U.S. Application Data

[60] Provisional application No. 60/070,502, Jan. 6, 1998.

[51] Int. Cl.[7] ........................... F16J 15/10
[52] U.S. Cl. ............ 277/596; 277/600; 277/593; 277/598; 411/546; 411/539
[58] Field of Search ................... 277/593, 600, 277/598, 630, 639; 411/546, 539, 180

[56] References Cited

U.S. PATENT DOCUMENTS

| | | | |
|---|---|---|---|
| 2,358,606 | 9/1944 | Summers | 411/546 |
| 3,146,010 | 8/1964 | Dellith | 411/539 |
| 4,795,166 | 1/1989 | Irmler | 277/1 |
| 5,836,367 | 11/1998 | Calabrese | 138/112 |

*Primary Examiner*—Anthony Knight
*Assistant Examiner*—Mark Williams
*Attorney, Agent, or Firm*—Harness, Dickey & Pierce, P.L.C.

[57] ABSTRACT

A static gasket for sealing mating flanges which are clamped together by at least one fastener. A carrier holds the seal in a groove and the seal is protected from over compression by a compression limiter which is inserted into an aperture in the carrier. The compression limiter is crescent shaped to permit the insertion of a fastener stud into a through hole formed between the compression limiter and the aperture in the carrier.

20 Claims, 3 Drawing Sheets

ELASTOMERIC SEALING ASSEMBLY

CROSS-REFERENCE TO RELATED APPLICATION

This application claims the benefit of Provisional Application Ser. No. 60/070,502, filed Jan. 6, 1998.

BACKGROUND OF THE INVENTION

Technical Field

This invention generally relates to compression limiter products. More specifically, this invention relates to a non-symmetrical and nonconcentric compression limiter which is used in conjunction with gasket assemblies. The concept of this invention is also related to nonconcentric compression limiters which are used in conjunction with plastic or metal carrier gaskets, or in composite covers or metal covers having a gasket or sealing member.

Resilient elastomer gaskets are being used in many static sealing applications because of their superior sealing performance and their long life capability. A designer must consider a large number of factors to produce a satisfactory seal. For example, inadequate compression or non-uniform stress distribution in an elastomeric element can result in a leaking joint. Flange pressure is another important factor which controls the success of a gasketed joint because it influences the creation of the initial seal and how well the seal is maintained over the life expectancy of the gasket.

Fasteners are used in many applications to apply a clamp load and to maintain the required flange pressure to seal the joint. The fastener produces a spring load on the gasket to compress the sealing element to its proper thickness so that the seal can produce a sealing force. The fastener must also maintain proper tension to ensure the proper compressive forces on the sealing element throughout the life of the assembly.

Approximately, eighty percent of the bolt load is concentrated around the area of the fastener. However, this has been known to lead to flange deflection and deformation and higher than expected localized loading conditions which can cause the elastomer seal to extrude and rupture. In many cases, it has been found advantageous to incorporate a bolt hole through the gasket thus, many designers use low creep symmetrical compression limiters in gaskets bolt holes to limit the compression on the sealing element. The size of the compression limiter depends on the compressive stress limitation of the flange material and the bolt forces generated at both hot and cold temperature conditions.

Another constraint which sealing engineers face is the amount of gasket sealing band width that is available around the bolt hole when a symmetrically shaped limiter is used. In some cases, the size of the symmetrical limiter is larger than the seal land width available on the mating surface and thus a sealing element cannot be designed to function properly around the symmetrical compression limiter. Furthermore, there may be insufficient seal land width around the compression limiter when the stack up tolerance conditions of all the components are evaluated and the seal land width of the flange is found to be inadequate. Thus, the use of symmetrically shaped limiters for gaskets has only met with partial success.

One solution used by seal designers for this problem is the use of non-symmetrical or nonconcentric compression limiters around the bolt holes. This has created problems in the production of plastic carrier gaskets and covers because of the high incidence of the misorientation of the asymmetrical limiters in bolt holes and due to the incidence of inserting incorrect limiters into the aperture in the gasket carrier or cover. Another approach used in the prior art is to mold the limiters into the plastic carrier or composite cover prior to molding the seal. This increases the cycle time of the plastic molding operation and increases the likelihood of mold damage because the compression limiter can pop out of its respective mold cavity before the mold closes. Additionally, if the limiter is not properly oriented in the mold, the carrier or cover can be molded without the properly positioned limiter. Another solution to this problem is to insert the limiter into the plastic carrier or cover as part of a post molding secondary operation. The need to assemble different geometric shaped limiters into a plastic carrier/cover can lead to increased cost and manufacturing complexity of the component.

Thus there is a need for a compression limiter design which provides a low cost, easily manufactured, low creep, non-symmetrical or nonconcentric compression limiter.

SUMMARY OF THE INVENTION

In accordance with the invention, a static gasket includes a gasket support member with an aperture, a seal adjacent to the support member, and a crescent-shaped member located in the aperture. The crescent-shaped member has a first arcuate segment adjacent to the aperture and a second arcuate intersecting the first arcuate segment. The second arcuate segment is shorter than the first arcuate segment. The second arcuate segment and the inside surface of the aperture forms a through hole which is smaller than the aperture.

It is an object of the present invention to provide a compression limiter which fits into the aperture of a gasket support member, which accommodates a seal around the aperture and yet permits the insertion of an adequate sized bolt compression limiter in the support member.

It is a further object of the present invention to provide a compression limiter which fits in an aperture and which forms a through hole smaller than the aperture to permit the insertion and piloting of a bolt therethrough.

It is still a further object of the present invention to provide a limiter with a first arcuate segment that is less than the entire inside surface of the aperture in the carrier and which when the limiter is inserted into the aperture forms a through hole that is smaller than the aperture.

These and other objects and features of the invention will become apparent from the description and especially taken in conjunction with the accompanying drawings illustrating the invention and one embodiment.

BRIEF DESCRIPTION OF THE DRAWINGS

The various advantages of the present invention will become apparent to one skilled in the art upon reading the following specification and by reference to the drawings which include.

DETAILED DESCRIPTION OF THE PREFERRED EMBODIMENT

The following description of the preferred embodiment is merely exemplary in nature and is in no way intended to limit the invention or its application or uses.

Figure 1:
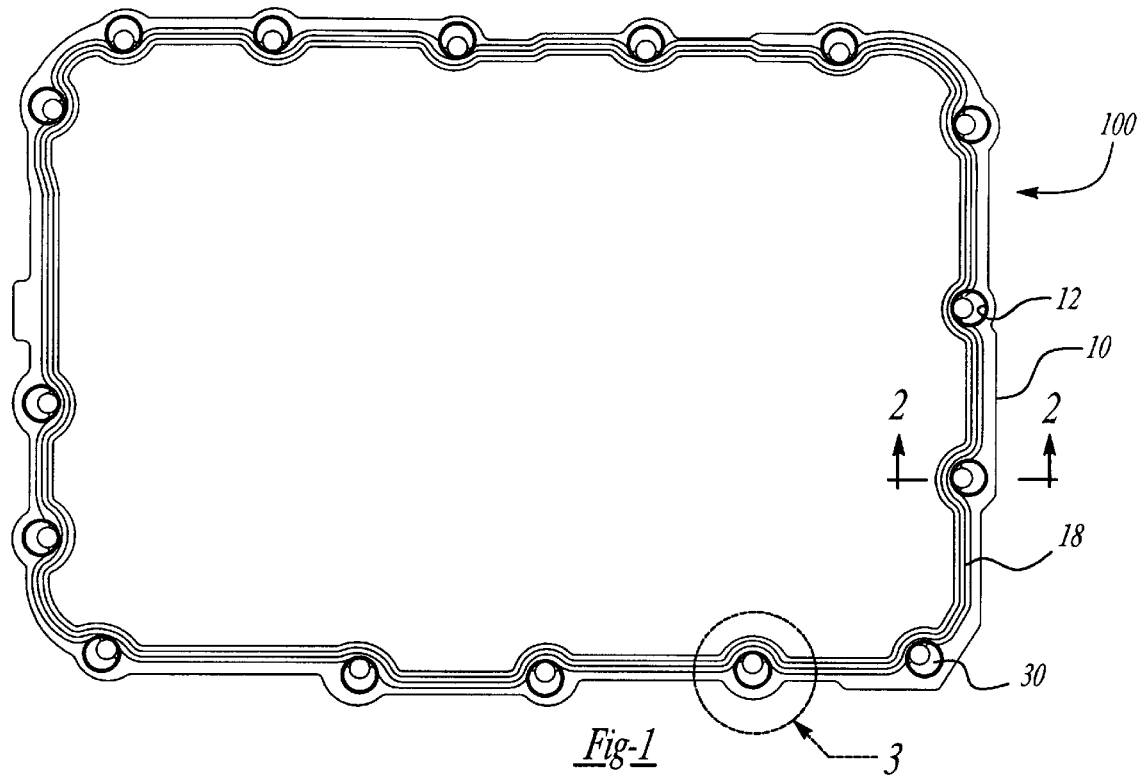
FIG. 1 is a top view of a gasket support member incorporating compression limiters in accordance with the invention.

The static gasket assembly according to the present invention is designated by the numeral 100 as is shown in FIG. 1. The static gasket 100 includes a carrier 10 which has a plurality of apertures 12 in a sealing element 18 which extends along the carrier 10. The carrier 10 is made of metal or plastic. The plastic container is typically 3 mm thick and is made of a thermoplastic or thermoset plastic material. Typically, the thermoplastic material is a nylon heat stabilized 6—6 material or it can be made of other suitable materials such as polyamide or the like. The choice of a thermoplastic material depends on the fluid to be sealed and the temperature range of the joint to be sealed. In the alternative, a thermoset plastic material such as polyester or vinylester or the like, can be used to hold the seal therein as for instance in encapsulating covers such as valve covers, front covers, rear seal retainers, oil pans, or the like. Alternatively, the carrier may be a metal gasket carrier or metal flange of an encapsulating cover member. The function of a plastic or metal carrier is to hold the elastomeric seal in place. This facilitates assembly and prevents misassembly of the sealing element in the joint.

Figure 2:
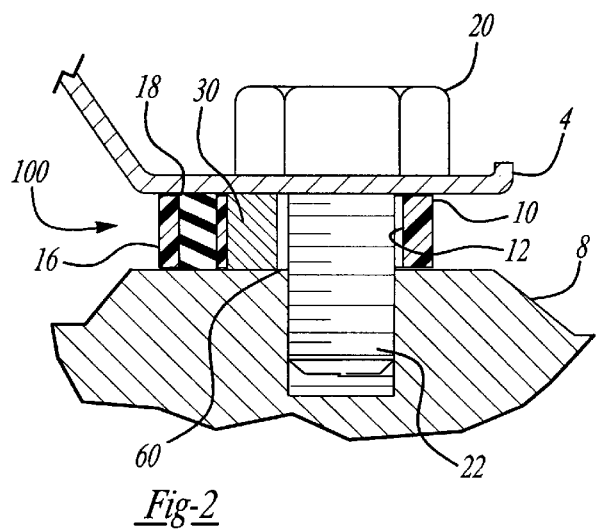
FIG. 2 is a sectional view along 2—2 of FIG. 1.

As shown in FIG. 2, the gasket assembly 100 is typically sandwiched between flange 4 and housing 8 and is clamped together by fastener member 20. In order to produce a sealing force, the sealing element 18 must be compressed sufficiently in order to produce a high line sealing force to prevent migration of fluids into or out of the cavity to be sealed. If the seal is overcompressed, the forces on the seal can cause it to extrude out of the groove 16 in the carrier 10. Under these circumstances, the sealing element 8 can extrude out of the groove 16 and rupture.

To prevent the seal from being overcompressed, a compression limiter 30 is inserted into each of the apertures 12 in the gasket carrier. Preferably, the aperture 12 is a circular hole 11 and alternatively the aperture is an elliptical hole 17. Once inserted into aperture 12, the limiter 30 forms a through hole 68 to permit insertion of a fastener member 20 therein so that the fastener can clamp the flange 4 and housing 6 together as will be discussed later. This provides the compressive force necessary to generate a high line sealing force in the sealing element 18. The high line sealing force prevents the migration of fluids past the joint to be sealed. The compression limiter may be made of metal or any low creep material such as phenolic or the like so long as the limiter prevents over-compression of the sealing element.

Figure 3:
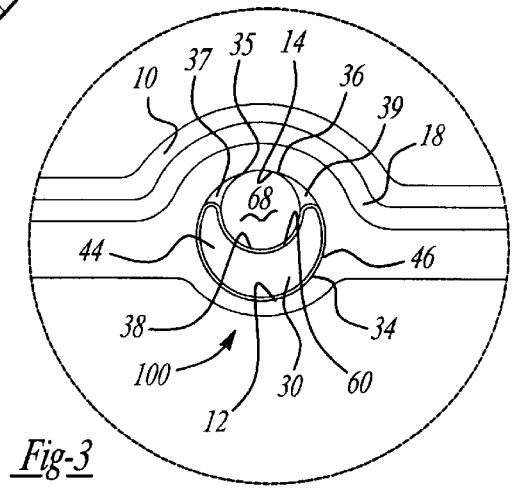
FIG. 3 is a partial bottom view in circle 3 of FIG. 1.
Figure 4:
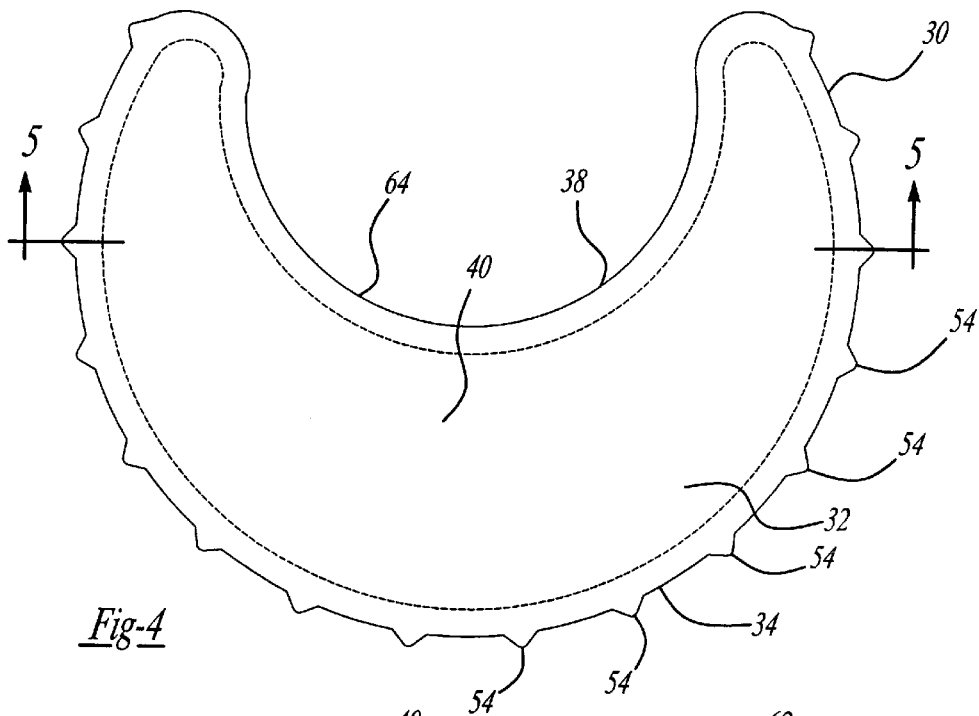
FIG. 4 is a top view of the compression limiter.

FIGS. 2 and 3 show the compression limiter 30 inserted into the aperture 12 in the carrier 10. The compression limiter 30 includes a crescent shape member 32 which has a first arcuate segment or outer segment 34 which cooperates with the inner or inside surface 14 of the aperture 12. The compression limiter 30 also has a second arcuate segment or inner arcuate segment 38 which has a radius which is smaller than the radius forming the first arcuate segment 34. The radius forming the first arcuate segment 34 and the radius forming the second arcuate segment 38 are formed on a common axis.

As shown in FIG. 3, the first arcuate segment 34 intersects the second arcuate segment 38 at junctions 35 and 36. When the limiter 30 is inserted into the aperture 12 of the carrier 10, the junctions 35, 36 are formed to intersect within the aperture 12. The top load bearing or compression limiting surface 40 is defined by the surface formed between the first arcuate segment 34 and the second arcuate segment 38. Similarly, the bottom load bearing surface 44 is formed on the opposite side of the limiter 30. The compression limiter 30 is formed with a rounded or curved surface near the junctions of the two arcuate surfaces 34, 38. The two pie-shaped areas 37, 39 that are defined by the rounded surfaces and the junctions 35, 36 are preferably removed to facilitate ease of manufacturing of the limiter 30.

The partial bore 60 and the portion of the aperture 12 that is not filled when the compression limiter 30 is inserted into the aperture 12, forms a through hole 68. As discussed previously, the two pie-shaped areas or voids 37, 39 are removed from the limiter 30 so that the through hole 68 is formed with two protruding pie-shaped apertures near the junctions 35, 36, however, those skilled in the art will recognize that alternatively, these two pie-shaped areas may be retained as part of the limiter 30. Preferably, the through hole 68 is substantially or generally a circular hole or bore 65. Alternatively, the through hole 68 is substantially or generally an elliptical bore or hole 67.

The compression limiter 30 when inserted into the aperture 12 in the carrier 10 forms a through hole 68 which permits the insertion of the diameter portion or shank portion 22 of the fastener member 20 therethrough.

Figure 5:
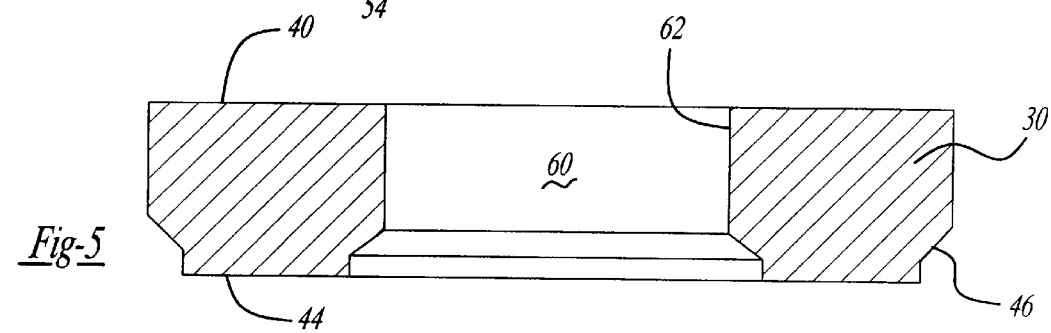
FIG. 5 is a sectional view taken along line 5—5 of FIG. 4.

The first arcuate segment or outer arcuate segment 34 has a plurality of ribs 54 formed thereon. The ribs 54 extend away from the outer arcuate segment of the compression limiter. The inner arcuate segment 38 has an inner peripheral surface 64. As shown in FIG. 5, the compression limiter 30 has a partial bore 60 which has an inner partial diametral bore of 62 formed therein. The partial bore 60 is formed with between 25% to 75% of the inner surface 64 of the second arcuate segment 38— or between 90° and 270° of a circle—. The bottom surface 44 of the compression limiter 30 has a chamfer 46 along the periphery of the limiter. The chamfer 46 permits the easy insertion of a compression limiter 30 into the carrier such as by pressing the limiter into the aperture 12 of the carrier 10. When using the compression limiter 100 according to the present invention, the rubber mold is significantly simplified from a manufacturability and maintenance standpoint. The pin that holds the aperture in the rubber mold is easily machined to size using conventional machining techniques such as lathe turning or the like and is easily replaceable. With prior art nonsymmetrical compression limiters, the aperture or the gasket carrier needs to be accurately oriented in the mold and requires an insert that is fastened to the cavity plate or requires a specifically machined pin. All of which are more expensive to make than the present invention. Furthermore, the compression limiter 30 according to the present invention permits a small degree of angular disorientation in the gasket carrier 10 without affecting the fit or function of the gasket 100. A prior art non-symmetrical compression limiter when inserted into a aperture in the gasket carrier with a small degree of angular disorientation can result in rubber mold damage or gasket carrier damage.

Figure 6:
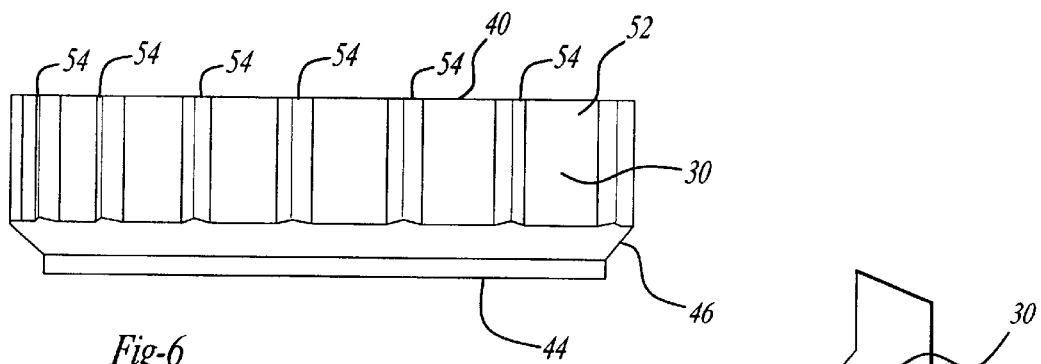
FIG. 6 is a side view of the limiter.

As shown in FIG. 6, the ribs 54 are formed on the arcuate surface 52 which is on the shoulder portion 50 of the compression limiter 30. The shoulder portion is formed between the top surface 40 and bottom surface 44.

Figure 7:
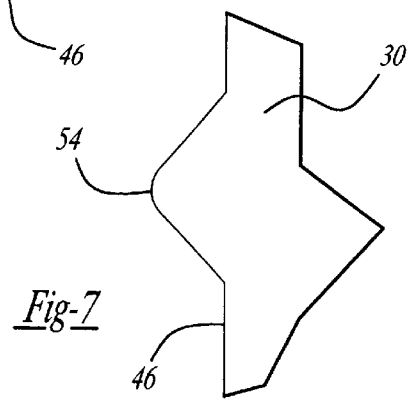
FIG. 7 is a blow-up of the rib shown in FIG. 4.

The ribs 54 are in the form of small triangles formed on the arcuate surface 52 as is shown in FIG. 7. The function of the ribs is to assure an interference fit between the shoulder portion 50 of the compression limiter 30 and the aperture 12 in the carrier 10.

Figure 8:
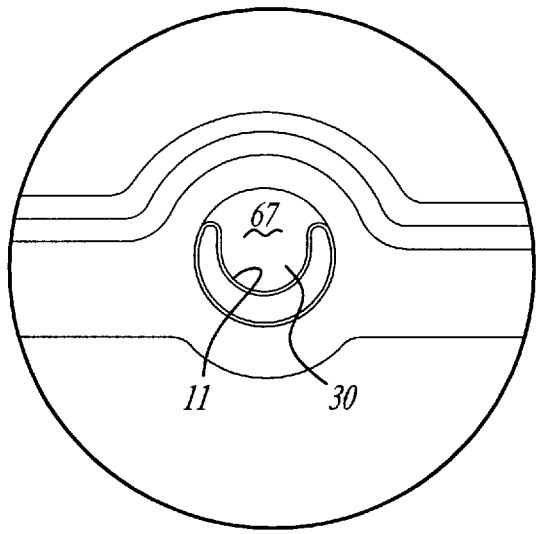
FIG. 8 is a top view of a first alternate embodiment of the invention.
Figure 9:
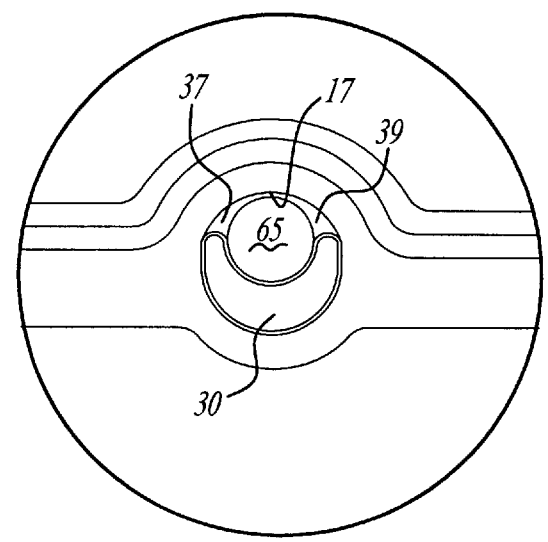
FIG. 9 is a top view of a second alternate embodiment of the invention.
Figure 10:
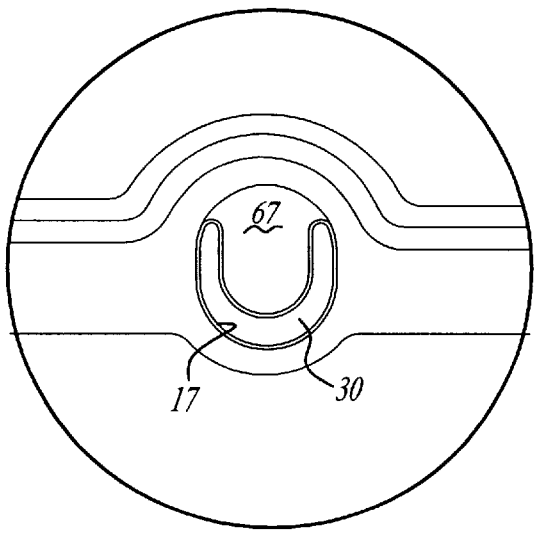
FIG. 10 is a top view of a third alternative embodiment of the invention.

The compression limiter 30 is preferably of a circular configuration to fit in a circular hole or bore 11 in the carrier 10 so as to form a circular hole 65, as shown in FIG. 3. Alternatively, the compression limiter 30 is of a circular configuration to fit in a circular hole or bore 11 in the carrier 10 so as to form an oval or elliptical hole 67, as shown in FIG. 8. In another alternative embodiment, the compression limiter 30 is of an elliptical configuration to fit in an oval or elliptical hole 17 to form an circular hole or bore 65 as shown in FIG. 9. In yet another alternative embodiment, the compression limiter is of an elliptical configuration to fit in an oval or elliptical hole 17 to form an oval or elliptical hole or bore 67 as shown in FIG. 10. These various embodiments may be employed to meet the thermal expansion and/or tolerance stack-up requirements of the specific application. The arcuate surface 52 of the compression limiter is contiguous with approximately 25 to 90% of the inner peripheral surface 64 of the aperture 12 in order to form the through hole 65 or elliptical hole 67. The inner bore 62 of the compression limiter 30 forms between 25 to 90% of the partial bore 60.

Those skilled in the art will recognize that the compression limiter may be made from steel or scintered from copper and steel or the like so long as the compressive strength of the limiter is sufficient to function in the flange to be clamped together. The elastomer seal may be made from a number of materials including nitrile, polyacrylate, ethylene-acrylic, silicone, fluoroelastomers, epichlorohydrin, natural rubber, butyl rubber, and the like. As stated previously, the selection of the elastomer will depend on the sealing requirements of the joint to be sealed such as temperature, fluid condition, leakage rate, and durability of the seal required.

While the invention has been described in connection with a preferred embodiment, it will be understand that it is not intended to limit the invention to that embodiment only. On the contrary, it is intended to cover all alternative modifications and equivalents that may be included within the spirit and scope of the invention as defined by the appended claims.

What we claim is:

1. A compression limiter comprising:
    a crescent shaped member having a first arcuate segment and a second arcuate segment intersecting said first arcuate segment, said second arcuate segment smaller than said first arcuate segment, said second arcuate segment forming a partial bore;
    an arcuate surface on said first arcuate segment; and
    a plurality of ribs on said arcuate surface, said ribs projecting away from said arcuate surface, said compression limiter adapted to be positioned between two surfaces to limit a compressive force applied to these surfaces.

2. A compression limiter as claimed in claim 1 wherein said second arcuate segment further having a second arcuate surface, said second arcuate surface forming between 90° and 270° of a circle.

3. A compression limiter as claimed in claim 1 wherein said ribs are equally spaced on said first arcuate surface.

4. A compression limiter as claimed in claim 1 wherein said crescent shaped member further having a top surface and a bottom surface, said bottom surface having a chamfer.

5. A compression limiter for preventing over compression of a gasket between a pair of mating surfaces, said gasket having a seal, a gasket carrier supporting said seal and portions defining an aperture in the gasket carrier, a fastener member clamping the pair of mating surfaces toward one another to compress the seal, said compression limiter comprising:
    a crescent shaped member inserted in the aperture in the gasket carrier, said crescent shaped member having a top side and a bottom side opposite said top side; and
    a shoulder portion between said top side and said bottom side, said top side having a first top arcuate segment adjacent to the aperture in the gasket carrier, said shoulder portion having an arcuate surface, said arcuate surface contiguous with less than the entire inner surface of the aperture in the gasket carrier.

6. A compression limiter as claimed in claim 5 wherein said top side further having a second top arcuate segment less than said first top arcuate segment, said second top arcuate segment forming a partial bore, said partial bore and the aperture in the gasket carrier forming a through hole to receive the shank of the fastener member therein.

7. A compression limiter as claimed in claim 6 wherein said partial bore of said second top arcuate segment extending over less than 90% said through hole.

8. A compression limiter as claimed in claim 6 wherein said arcuate surface having a plurality of ribs, said ribs creating an interference fit with the inner surface of the aperture in the gasket carrier.

9. A compression limiter as claimed in claim 6 wherein said shoulder portion having an inner surface, said inner surface forming a partial bore, said partial bore extending over at least 25% of the inner surface of said through hole.

10. A static gasket comprising:
    a carrier having portions defining an aperture;
    a seal on said carrier;
    a crescent shaped member in said aperture, said crescent shaped member having an outer arcuate segment adjacent to at least 50% of the inside surface of said aperture and an inner segment intersecting said outer arcuate segment, said inner segment and the inside surface of said aperture of said carrier forming a though hole.

11. A static gasket as claimed in claim 10 wherein said crescent shaped member having a top side, a bottom side in spaced relation to said top side and a shoulder portion between said top side and said bottom side, said outer arcuate segment having an arcuate surface, said arcuate surface adjacent to said aperture of said carrier; and further comprising:
    a plurality of ribs formed on said arcuate surface, said plurality of ribs creating an interference fit with portions of at least 50% of the inside surface of said aperture.

12. A static gasket as claimed in claim 10 wherein said through hole is smaller than said aperture in said carrier.

13. A static gasket as claimed in claim 10 wherein said through hole having an inner peripheral surface, said inner peripheral surface extending over at least 25% of the inner periphery of said through hole.

14. A static gasket as claimed in claim 10 wherein said aperture in said carrier is circular.

15. A static gasket as claimed in claim 14 wherein said through hole is substantially round.

16. A static gasket as claimed in claim 10 wherein said aperture in said carrier is elliptical.

17. A static gasket as claimed in claim 16 wherein said through hole is substantially elliptical.

18. A static gasket as claimed in claim 10 wherein said aperture is elliptical and said through hole is substantially round.

19. A static gasket as claimed in claim 10 wherein said aperture is round through hole is a substantially elliptical.

20. A static gasket as claimed in claim 10 wherein said crescent shaped member forming portion defining a pie shaped aperture near the intersection of said inner segment and said outer arcuate segment.

* * * * *